United States Patent [19]
Reiner

[11] 3,769,721
[45] Nov. 6, 1973

[54] EDUCATIONAL DEVICE

[76] Inventor: George Reiner, 16 E. 52d St., New York, N.Y. 10022

[22] Filed: Feb. 14, 1972

[21] Appl. No.: 225,780

[52] U.S. Cl. .................................. 35/9 R, 35/35 D
[51] Int. Cl. ............................................ G09b 1/10
[58] Field of Search .................... 35/9 D, 9 R, 35 D

[56] References Cited
UNITED STATES PATENTS
2,505,230    4/1950    Composto .......................... 35/35 D Primary Examiner—Wm. H. Grieb
Attorney—Alex Friedman et al.

[57] ABSTRACT

An educational device in which a problem is presented to a child and in which the device is set to be keyed to the correct answer in such a manner that answer carrying members can be mounted in the device only when the correct answer is selected by the child. The answers are embodied in one or more individual card-like components and the device is preset so that the device will accept only the correct card-like components in response to any particular problem.

7 Claims, 4 Drawing Figures

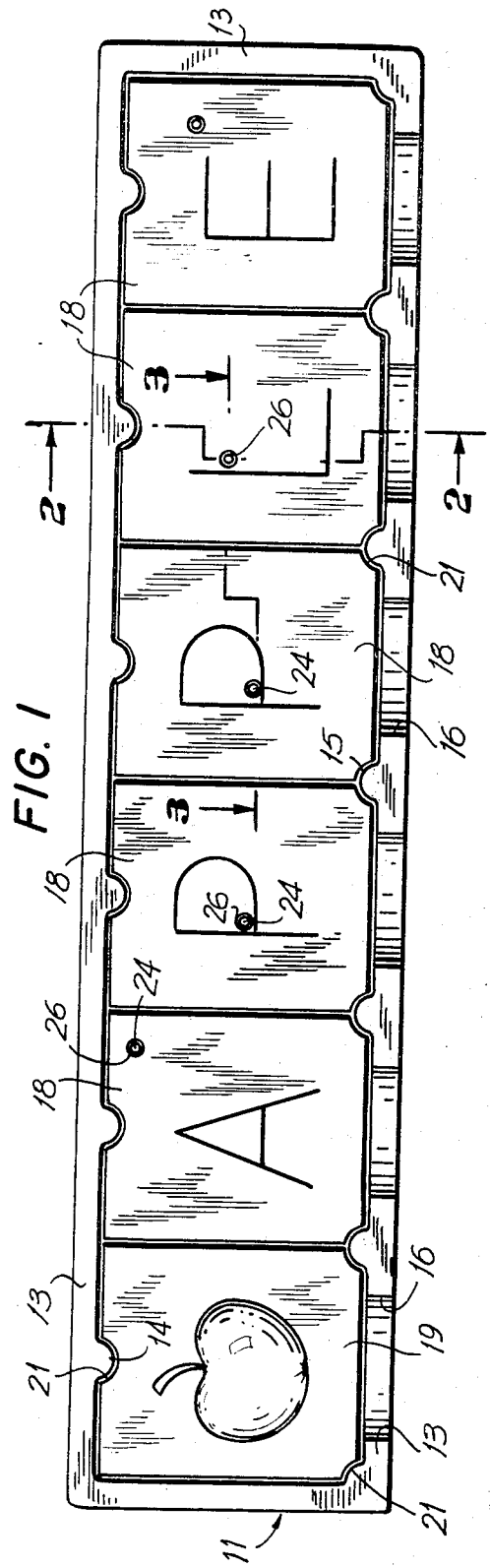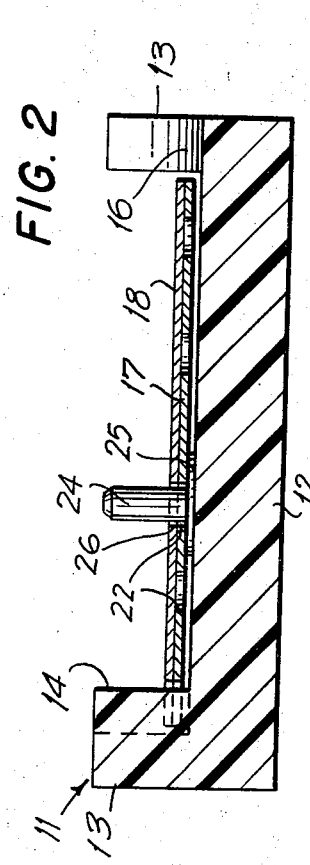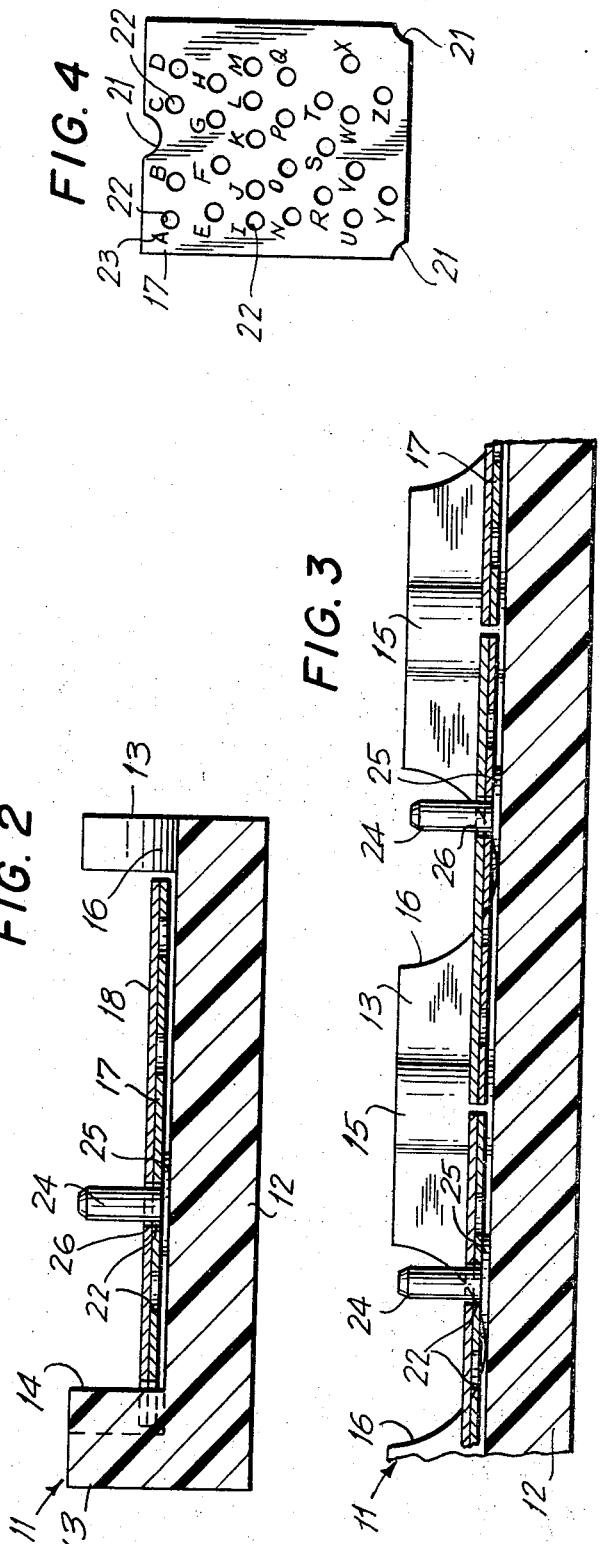

3,769,721

EDUCATIONAL DEVICE

BACKGROUND OF THE INVENTION

Numerous educational devices have been marketed which pose problems for a child and which mandate a correct answer. However, such devices are often expensive if versatile or not versatile enough to pose a wide variety of problems if relatively inexpensive.

SUMMARY OF THE INVENTION

Generally speaking, in accordance with the invention, a tray is provided having a plurality of individual pockets. Cards are designed for mounting in the pockets and the pockets also carry changeable keyed elements which are individually keyed to the cards. A problem can be set up by an adult such as the spelling of a word or the solving of a mathematical equation in such a manner that only the correct card can be inserted in each pocket utilized for the problem. The key system in each pocket can be readily changed so that a substantially infinite number of problems may be posed.

Accordingly, it is an object of this invention to provide an improved educational device of great versatility.

Another object of the invention is to provide an educational device having a key system which can be widely varied.

A further object of the invention is to provide an educational device designed to receive a plurality of cards in individual pockets in which the key system in each pocket can be adjusted to dictate a plurality of problems and the solutions thereto.

Still other objects and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWING

For a fuller understanding of the invention, reference is had to the following description taken in connection with the accompanying drawing, in which:

FIG. 1 is a plan view of an educational device constructed in accordance with the instant invention;

FIG. 2 is a sectional view taken along line 2—2 of FIG. 1;

FIG. 3 is a partial sectional view taken along line 3—3 of FIG. 1; and

FIG. 4 is a bottom plan view of a keyed card forming a part of the device shown in the preceding figures.

DESCRIPTION OF THE PREFERRED EMBODIMENTS

A tray 11 is formed with a bottom wall 12 and upstanding side walls 13 defining the periphery of the tray. The tray is effectively divided into a plurality of pockets for receiving a plurality of cards although there need be no intermediate wall separating the pockets. FIG. 1 shows a tray having six pockets. One longitudinal wall carries a plurality of projections 14, one for each pocket and the opposite upstanding wall carries a plurality of differently spaced projections 15 for a purpose to be hereafter described. One of the longitudinal walls along each of the effective pockets is provided with a recess 16 whose use will also hereafter become apparent.

The educational device includes two basic types of cards and a third card suitable for use when a problem such as a spelling problem is posed. The cards are identified as 17, 18 and 19.

Card 19 is shown in FIG. 1 as mounted in the first pocket and card 19 carries pictorial matter designed to pose a spelling problem. Card 19 includes a plurality of keyways 21 designed to mate with projections 14 and 15 to assure proper placement of card 19 in the first pocket. In the embodiment shown, card 19 depicts an apple.

Cards 17 and 18 also include a plurality of keyways 21 for cooperation with projections 14 and 15 for proper positioning of the cards in each of the pockets.

Card 17 is best seen in FIG. 4 wherein the bottom side thereof is shown. Card 17 carries a plurality of apertures 22 which, in the embodiment of FIG. 4, are equal in number to the number of letters in the alphabet. Indicia 23 keying each of the apertures 22 to a letter of the alphabet are imprinted on card 17. Card 17 could also carry the numerals zero through nine keyed to 10 apertures 22 or 36 apertures with indicia keying the apertures to the 26 letters of the alphabet and the ten numerals zero through nine.

A plurality of pins 24 which may have a head 25 are provided for setting up the problem. The shaft of each pin 24 is of a size to pass through an aperture 22.

A letter or numeral is printed or otherwise applied to each of the cards 18. Each card 18 also carries a single aperture 26 and the location of the aperture 26 in any particular card is determined by the location of the corresponding aperture on card 17.

For example, the first card 18 shown in FIG. 1 carries the letter "A". Aperture 26 in card 18 is located in the upper right hand corner which precisely corresponds to the location of aperture 22 keyed by the letter A in card 17. The showing of card 17 in FIG. 4 is of the reverse side so that, in normal position, card 17 would be flipped over and will be seen that aperture 22 in card 17 adjacent the letter A will precisely correspond in position to aperture 26 in the card 18 having the letter A thereon. Examination of the additional cards 18 in FIG. 1 will show that the apertures 26 are properly located to correspond with the appropriate apertures in card 17.

The use of the educational device of the instant invention may now be understood. A card 19 carrying the picture of an apple, for example, is inserted in the left hand pocket. Five cards 17 are selected and five pins 24 are also used. For the second pocket, a pin 24 is inserted through an aperture 22 in card 17 corresponding to the letter A and the card with the pin is then mounted in the second pocket. For the third pocket, pin 24 is passed through the aperture in a card 17 corresponding to the letter P and the card is then mounted in the third pocket. The same sequence is followed for the fourth, fifth and sixth pockets with the pin in the fourth pocket corresponding to the letter P, the pin in the fifth pocket corresponding to the letter L and the pin in the sixth pocket corresponding to the letter E. The device so set up is given to a child and the child sees the picture of the apple and five blank pockets each having a pin projecting upwardly from the bottom thereof. The child is also given a plurality of cards 18 with a letter on each card. The child must now select the correct letter for each pocket to spell the word "apple". If he selects the letter A for the second pocket, he will find that he is able to insert card 18 carrying letter A into the second pocket as aperture 26 will be in a proper position to overfit with pin 24. If the wrong letter is selected, the aperture in card 18 will not properly align with the pin 24 and the card will not fit in the pocket. This routine is followed for each pocket and the child will know that he has correctly spelled the word if the letter cards 18 fit in the pockets with pins 24 projecting therethrough. The provision of projections 14 and 15 cooperating with the keyways or cutouts 21 in the cards assures that the cards can fit in the pockets in only one position. Also the provision of recesses 16 allow the edges of the cards to be gripped for lifting the cards from the pockets.

While a card 17 with a plurality of apertures 22 for receiving a pin 24 in any one of plural locations has been disclosed as a perferred embodiment, it will be understood that card 17 could have a pin fixed thereto and indicia to indicate the letter or numeral position so that each card 17 will be fixedly related to a single letter or numeral. Also, the pin could be permanently affixed to card 18 with the keyed aperture being in card 17. It should also be noted that the cards 18 could be embossed with raised characters rather than imprinted with letters or numerals making the educational device particularly suitable for use in the teaching of the blind.

While a six-pocket device has been shown, it will be understood that any number of pockets could be provided. Also, the example indicated herein is for the spelling of a word. It will be understood that a mathematical problem could also be set up with the pocket or pockets left opened for the answer carrying pins 24 properly keyed to numeral carrying cards 18 so that the cards will not fit into the pockets unless the correct answer is selected. With the device of the instant invention, the child can automatically tell whether he has given the correct answer or spelled the word correctly and thus he is able to work with a problem until he comes up with the correct answer without the need for an adult to be constantly present.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An educational device comprising a tray having a plurality of card receiving pockets therein, a plurality of first cards each having a plurality of apertures therein and carrying different indicia identifying each of said apertures, a plurality of second cards each having an aperture therein and indicia thereon, the indicia on each of said second cards being identical to only one of the indicia on said first cards, said aperture in said second card being positioned for alignment with the aperture in said first card which corresponds to the indicia on said second card, and a plurality of pins sized to be received in said apertures.

2. An educational device as claimed in claim 1 wherein said cards and said pockets include cooperating alignment means for assuring proper positioning of said cards in said pockets.

3. An educational device as claimed in claim 2 wherein said cooperating alignment means includes projections on said trays in each of said pockets and keyways in said cards.

4. An educational device as claimed in claim 3 wherein each pocket includes a recess for permitting access to a card when positioned in a pocket.

5. An educational device as claimed in claim 1 wherein each of said pins includes a generally cylindrical shaft and a substantially flat head at one end of said shaft.

6. An educational device as claimed in claim 1 and further including a plurality of third cards each depicting thereon an identifiable object.

7. An educational device as claimed in claim 6 wherein said plurality of third cards are sized to be received in one of said pockets.

* * * * *